(12) United States Patent
Kawahara et al.

(10) Patent No.: US 6,272,106 B1
(45) Date of Patent: Aug. 7, 2001

(54) METHOD AND DEVICE FOR DETECTING DOUBLE-TALK, AND ECHO CANCELER

(75) Inventors: Toshiro Kawahara; Tomoyuki Ohya, both of Yokosuka; Masahito Saigusa; Nobuhiko Naka, both of Yokohama, all of (JP)

(73) Assignee: NIT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 08/513,891

(22) PCT Filed: May 2, 1995

(86) PCT No.: PCT/JP95/00864

§ 371 Date: Mar. 2, 1998

§ 102(e) Date: Mar. 2, 1998

(87) PCT Pub. No.: WO95/31050

PCT Pub. Date: Nov. 16, 1995

(30) Foreign Application Priority Data

| May 6, 1994 | (JP) | 6-117636 |
| May 6, 1994 | (JP) | 6-117637 |
| May 6, 1994 | (JP) | 6-117638 |
| May 6, 1994 | (JP) | 6-117639 |

(51) Int. Cl.[7] ........................... H04B 3/20
(52) U.S. Cl. ............ 370/201; 370/286; 379/410
(58) Field of Search ............... 370/201, 286, 370/287, 288, 289, 291, 292; 379/410, 406, 611

(56) References Cited

U.S. PATENT DOCUMENTS

| 4,282,411 | * | 8/1981 | Stuwart . |
| 4,712,235 | * | 12/1987 | Jones et al. . |
| 5,193,112 | * | 3/1993 | Sano . |
| 5,278,900 | * | 1/1994 | Van Gerwen et al. . |
| 5,305,309 | * | 4/1994 | Chujo et al. . |
| 5,859,907 | * | 1/1999 | Kawahara .......................... 379/410 |

FOREIGN PATENT DOCUMENTS

| 51-011313 | 1/1976 | (JP) . |
| 57-130099 | 8/1982 | (JP) . |
| 58-057197 | 4/1983 | (JP) . |

(List continued on next page.)

OTHER PUBLICATIONS

Ezzaidi et al. "A new Algorithm for double talk detection and separation in the context of digital mobile radio telephone", Proceedings. IEEE International Conference on Acoustics, Speech and Signal Processing, vol. 3, (1997) pp. 1897–1900.

*Primary Examiner*—Huy D. Vu (57) ABSTRACT

This invention relates to a double talk detecting method suited to be used for an echo canceler, and more particularly to a method for correctly detecting whether or not the double talk is present, even in the case where a speech transmitting level difference between a far-end talker and a near-end talker is comparatively large. What is assumed in the present invention is an echo canceler which can be employed in a telephone line network for transmitting a speech of a far-end talker sent through a digital line and a speech of a near-end talker sent through an analog line. A double talk detecting method applicable to the echo canceler here extracts predetermined analyzed parameters respectively from a first speech signal corresponding to the speech of the far-end talker sent from the echo canceler to a hybrid circuit and the speech of the near-end talker input to the echo canceler through the hybrid circuit. The analyzed parameters herein used include, for example, speech pitches, frequency components, etc., of each of the speech signals. In this invention, the analyzed parameters themselves or correlation values of the fluctuations of the analyzed parameters, etc. are calculated and a detection is made as to whether or not the double talk is present, based on the result of calculation.

10 Claims, 6 Drawing Sheets

SECOND EMBODIMENT

FOREIGN PATENT DOCUMENTS

| | | |
|---|---|---|
| 62-65525 | 3/1987 | (JP) . |
| 62-176337 | 8/1987 | (JP) . |
| 63-287118 | 11/1988 | (JP) . |
| 1-126839 | 5/1989 | (JP) . |
| 2-288734 | 11/1990 | (JP) . |
| 3-120434 | 5/1991 | (JP) . |
| 4-128900 | 4/1992 | (JP) . |

* cited by examiner

FIG.2
FIRST EMBODIMENT

FIG.3
SECOND EMBODIMENT

FOURTH EMBODIMENT

FIG.9

METHOD AND DEVICE FOR DETECTING DOUBLE-TALK, AND ECHO CANCELER

TECHNICAL FIELD

This invention relates to a double talk detecting method which is carried out in a mobile communications network and in a long-distance telephone line network when echo is canceled, a double talk detecting apparatus and an echo canceler, which are suited to be used for carrying out the afore-mentioned method.

BACKGROUND ART

In a long-distance telephone line via a submarine cable or via a communication satellite, the subscriber's line, in general, connected to both ends of the line is of a two-wire circuit and its long-distance transmission portion is of a four-wire circuit employed for amplification of signal and some other purposes. Similarly, in the mobile communications network using a mobile telephone (or cellular phone), the subscriber's line of a terrestrial analog telephone is of a two-wire circuit and its portion from a terminal of the mobile telephone to a switch, etc. is of a four-wire circuit. In this case, the connection region between the two-wire and the four-wire is provided with a hybrid circuit for performing a four-wire/two-wire conversion. This hybrid circuit is designed to match with the impedance of the two-wire circuit. However, since it is difficult to obtain always a good matching condition, a received signal reaching an input side of the four-wire of the hybrid circuit tends to leak toward an output side of the four-wire, thereby generating a so-called echo. Since such an echo reaches the talker at a lower sound level than the talker's voice and after a delay of a predetermined time period, a speech hindrance is created. Such a speech hindrance caused by echo becomes significant as the signal propagation time becomes longer. Particularly, in the case of a mobile communication with the aid of a mobile telephone, since various processing procedures are carried out in the radio communication section leading to the switch, etc., the delay of signal is increased, thus resulting, particularly, in the problem of speech hindrance caused by echo.

Figure 1:
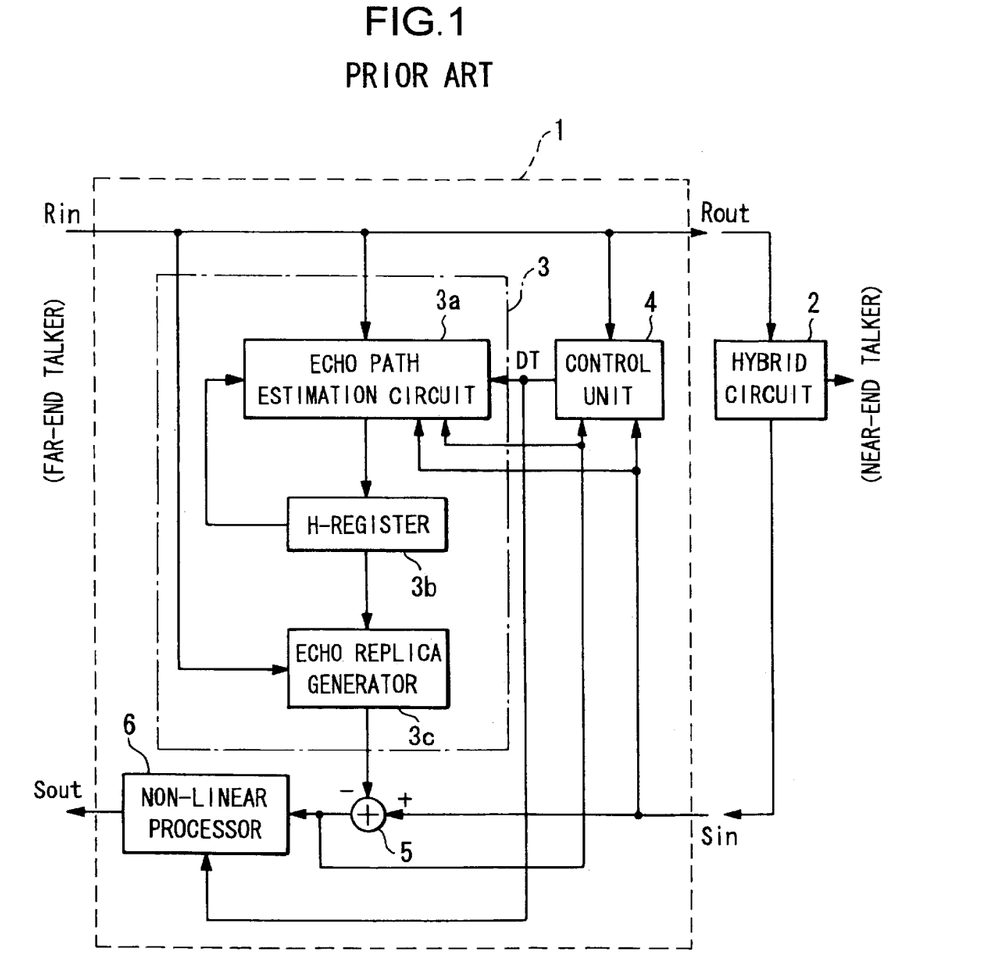
FIG. 1 is a block diagram showing a construction of a conventional echo canceler.

As an apparatus for preventing a generation of echo, there are an echo suppressor and an echo canceler. FIG. 1 shows a schematic construction of an echo canceler which can be used in a mobile communications network. The echo canceler 1 illustrated here is located on a front stage of a hybrid circuit 2. In this illustration, the subscriber of an analog telephone is referred to as the "near-end talker" and the subscriber of a mobile telephone as the "far-end talker". A far-end speech signal input into the echo canceler 1 is represented by Rin; a far-end speech signal output from the echo canceler 1, by Rout; a near-end speech signal input into the echo canceler 1, by Sin; and a near-end speech signal output from the echo canceler 1; by Sout, respectively.

The echo canceler 1 shown in FIG. 1 comprises an echo path estimation circuit/echo replica generator 3, a control unit 4, an adder 5, and a non-linear processor 6. Here, the echo path estimation circuit/echo replica generator 3 detects a response characteristic of the hybrid circuit 2 based on both the far-end speech input Rin and near-end speech input Sin and estimates an echo path (namely, echo propagating line). Then, an anticipated echo (namely, echo replica) from the hybrid circuit 2 is generated through a convolutional operation as a result of estimation and the far-end speech input Rin. In the adder 5, this echo replica is subtracted from the near-end speech input Sin, thereby canceling the echo.

As the above-mentioned echo path estimation algorithm, a learning identification algorithm is used. Among many adaptive algorithms, this learning identification algorithm is comparatively small in computational complexity and good in convergence characteristic.

As shown in FIG. 1, the echo path estimation circuit/echo replica generator 3 includes an echo path estimation circuit 3a, an H-register 3b, and an echo replica generator 3c. In this case, the echo path estimation circuit 3a estimates an echo path using the learning identification algorithm which is, among many other adaptive algorithms, generally comparatively small in computational complexity and good in convergence characteristic, and writes a tap coefficient (as later described) corresponding to the estimated echo path in the H-register 3b. The echo replica generator 3c comprises an FIR adaptive digital filter. The generator 3c generates an echo replica using the tap coefficient in the H-register 3b and through a convolutional operation with the far-end speech input Rin. The learning identification algorithm is a known estimation algorithm as disclosed, for example, in Institute of Electronics and Communication Engineers of Japan (IECE) Journal '77/11 Vol. J60-A NO.11, article under the heading of "Regarding Echo Canceling Characteristic of Echo Canceler Using Learning Identification Algorithm" (written by: Itakura and Nishikawa). The outline of the learning identification algorithm discussed in this article will be briefly described.

Firstly, if the impulse response h(t) and input signal x(t) are used presuming that the signal propagation characteristic of the echo path is linear, the echo $y_k$ at the time kT (where T is a sampling interval) can be expressed as follows.

$$y_k = h^t x_k \tag{1}$$

where:

$$h=(h_1, h_2, \ldots, h_n), h_j=h(jT)$$

$$x_k=(x_{k-1}, x_{k-2}, \ldots, x_{k-n})^t, x_j=x(jT) \tag{2}$$

(where $^t$ is transposition of vector)

On the other hand, if the estimation value of h at the time kT is represented by $H_k$ (hereinafter referred to as the "tap coefficient"), an estimation value $Y_k$ of $y_k$ can be given by the following expression.

$$Y_k = H_k^t x_k \tag{3}$$

Then, a successive correction of $H_k$ according to the learning identification algorithm is made by $$H_{k+1} = \begin{cases} H_k + \alpha(x_k e_k)/(x_k x_k) & (x^t x_k \geq ne^2) \\ H_k & (x^t x_k < ne^2) \end{cases} \tag{4}$$

where:

$$e_k = y_k - Y_k \tag{5}$$

Namely, $e_k$ is a residual echo. This residual echo appears on the output side of the adder 5. As apparent from the above expression (5), the next tap coefficient $H_{k+1}$ is calculated so that the residual echo will be reduced. Through calculation in the digital circuit, the above-mentioned algorithm can be specifically expressed as listed below. Firstly, the far-end speech input Rin, which is taken into the echo path estima tion circuit 3a, is handled as a digital signal Xt (where t is a sampling time) having N pieces of sample values.

$$X_t=(x(t), x(t-1), \ldots, \ldots x(t-(N-1))) \quad (6)$$

If the tap coefficient $H_t$ at the time t written in the H-register 3b can be expressed as follows, $$H_t=(h_t(0), h_t(t), \ldots, h_t(N-1)) \quad (7)$$

the convolutional operation in the echo replica generator 3c (FIR filter) can be expressed as follows.

$$Y(t) = \sum_{i=0}^{N-1} (t-1) \times h_t(i) \quad (8)$$

If the inner product of the vector is represented by "*" here, the above expression (8) can be rewritten as follows.

$$Y(t)=x_t{}^*H_t \quad (9)$$

Now, if the residual echo obtained on the output side of the adder 5 is represented by er(t), the following expression can be obtained.

$$er(t)=e(t)-Y(t) \quad (10)$$

From the expressions so far listed, a fluctuation $\Delta H_t$ of $H_t$ can be expressed as follows.

$$\Delta H_t=g \times er(t) \times x_t/(x_t{}^*X_t) \quad (11)$$

$H_{t+1}$ can be expressed as follows.

$$H_{t+1}=H_t+\Delta H_t \quad (12)$$

Therefore, the echo path estimation circuit 3a reads the tap coefficient H in the H-register 3b. By adding $\Delta H_t$, which is calculated in the expression (11), to the tap coefficient H thus read, the echo path estimation circuit 3a, in turn, calculates the next tap coefficient $H_{t+1}$ and writes it in the H-register 3b. In this way, the tap coefficients H in the H-register 3b are gradually renewed. What has been described so far is a specific computation in the digital circuit according to the learning identification algorithm. Also, the above expressions (6) to (12) are disclosed in Japanese Patent Laid-Open Application No. Hei 5-129989 and some others.

As conditions for enabling the above learning, the following requirements must be met.

①A far-end speech output Rout of the level sufficient for an echo to come back as a near-end speech input Sin is present. In other words, the far-end taker is currently engaged in speech.

②The near-end speech input Sin is constituted merely of an echo (or an echo and a white noise). In other words, the near-end taker is not engaged in speech.

On the other hand, when the far-end talker is in a speechless condition and when the far-end talker and the near-end talker are simultaneously engaged in speech (this state is hereinafter referred to as the "double talk"), it is necessary to turn off the learning function because there is a fear to cause a mis-learning state of echo path estimation.

In the transmission line, digital signals are transmitted, and a D/A conversion (in a general expression, a μ-LAW conversion) is made between the echo canceler 1 adapted to process such digital signals and the hybrid circuit 2 adapted to undertake a conversion to the analog line. For this reason, a non-linear characteristic relation is established between the far-end speech output Rout and the near-end speech input Sin. Therefore, echo cannot be canceled completely only through the linear computation by means of the echo path estimation circuit/echo replica generator 3, etc. As a consequence, an echo component unable to be completely canceled is produced. In order to remove such an echo component (hereinafter referred to as the "residual echo"), the non-linear processor 6 is employed. This non-linear processor 6 undertakes a non-linear switching operation. Specifically, in case the near-end speech output Sout is constituted merely of an echo, in other words, in case only the far-end talker is currently engaged in speech (this state is hereinafter referred to as the "far-end talker's single talk"), a switching operation is made such that the transmission of the near-end speech output Sout is prohibited or an operation is made such that the near-end speech output Sout is replaced by a pseudo noise.

The control unit 4 controls the echo path estimation circuit/echo replica generator 3 and the non-linear processor 6. That is, the control unit 4 detects the far-end taker's speechless condition or detects the double talk, controls the ON/OFF state of the learning function of the echo path estimation, detects the far-end talker's single talk, and controls the switching operation of the non-linear processor 6.

As a method for detecting the double talk carried out in the control unit 4, a power ratio of the far-end speech output Rout to the near-end speech input Sin is heretofore used, and if this ratio exceeds an expected echo level (for example, the maximum echo level 6 dB specified by CCITT standards), it is judged that the double talk has occurred. However, this conventional double talk detecting method has such a problem in that the detection is delayed. That is, in case there is no sufficient level difference at the beginning of generation of the double talk, the double talk is not detected and only when the level difference exceeds a predetermined value, the double talk is detected. As a consequence, a detection of the double talk is not performed at a good timing. Also, in the case where the speech levels of the far-end taker and near-end talker are greatly different, the double talk cannot be detected effectively.

Namely, in the case where the power for transmitting the far-end talker's speech is larger than the power for transmitting the near-end talker's speech, the ratio of the generated echo power to the transmitting power of the near-end talker's speech becomes small. In such a case, the difference between the power for transmitting echo and the power for transmitting the near-end talker's speech is reduced and therefore, it becomes difficult to smoothly distinguish the echo from the near-end talker's speech. As a consequence, it becomes difficult to detect the double talk accurately.

The low accuracy of the double talk detection causes a fear of mis-learning of the echo path estimation. Such a mis-learning not only deteriorates the function of echo cancellation but also to generate a wrong echo replica, thereby sending noises to the far-end taker, etc.

DISCLOSURE OF INVENTION

The present invention has been accomplished in view of such a background as mentioned above. It is, therefore, a first object of the invention to provide a double talk detecting method in which features specified by a far-end speech signal and a near-end speech signal are extracted to detect the double talk correctly. A second object of the invention is to provide a double talk detecting apparatus and an echo canceler, which are suited to be used for carrying out the afore-mentioned method.

In order to achieve the above objects, according to the present invention, there is provided a double talk detecting method applicable to an echo canceler which is employed in a telephone line network for performing a transmission between a speech coming through a four-wire circuit and another speech coming through a two-wire circuit, comprising:

a first step of extracting a first feature from a first speech signal corresponding to a speech on the four-wire circuit side, the first feature being specified by a waveform of the first speech signal;

a second step of extracting a second feature from a second speech signal corresponding to a speech on the two-wire circuit side, the second feature being specified by a waveform of the second speech signal; and a third step of comparing the first feature with the second feature and judging whether or not a double talk is present, based on a result of the comparison.

What is most easily extracted as the first and second features here includes various kinds of analyzed parameters such as pitches, formants and band widths of those speech signals. At that time, the speech signals may be divided into a plurality of frequency bands in order to compare the first and second speech signals in each frequency band. Further, what is meant by the expression "the features specified by the waveforms of the speech signals" is, in some cases, a mere sampling result of those speech signals. Let us presume here, for example, that the double talk detecting method is applied to an echo canceler and the learning state in the echo canceler is fluctuated depending on the sampling result of speech signals. If the learning state in the echo canceler is fluctuated when the double talk occurs, a judgment can be made as to whether or not the double talk is present, with reference to the learning state itself.

According to the teaching of the present invention, since it is judged whether or not the double talk is present, based on the above-mentioned features, a correct judgment can be made as to whether or not the double talk is present even in the case where the difference of speech transmitting levels between the far-end talker and the near-end talker is great.

BEST MODE FOR CARRYING OUT THE INVENTION (First Embodiment)

Figure 2:
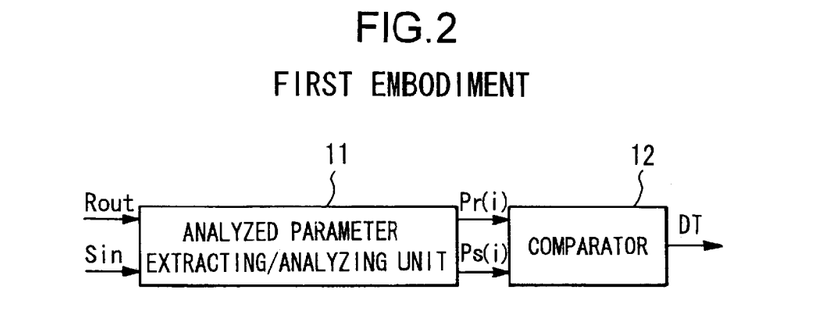
FIG. 2 is a block diagram showing a schematic construction of an apparatus embodying a double talk detecting method according to a first embodiment of the present invention.

FIG. 2 is a block diagram showing a schematic construction of an apparatus embodying a double talk detecting method according to the present invention. This apparatus is located in the afore-mentioned control unit 4. In this illustration, reference numeral 11 denotes an analyzed parameter extracting/analyzing unit. In this embodiment, speech pitches are employed as analyzed parameters which are used for detecting the double talk. The speech pitches indicate a vibration cycle of human vocal cords. For example, in a case of an active speech, the vocal cords are vibrated and a predetermined basic cycle (or basic frequency) appears in the vibration. The analyzed parameter extracting/analyzing unit 11 extracts such speech pitches. In order to do that, some actions are required to do; for example, discrimination of an active speech from a speechless condition, detection of the basic cycle in the case of active speech, and the like. Since such techniques are already proposed in various manners and known, detailed description thereof is omitted here.

The analyzed parameter extracting/analyzing unit 11 extracts analyzed parameters $Pr(i)$ and $Ps(i)$ (where, i shows the time and i=0, 1, . . . ) respectively from the far-end speech output Rout and from the near-end speech input Sin. In this case, the input speech signals are measured/accumulated for a certain time (for example, about 10 ms) and thereafter, the analyzed parameters are extracted. That is, it takes for 10 ms until the first analyzed parameter is extracted but thereafter the analyzed parameters are extracted at intervals corresponding to sampling pitches.

The above-mentioned analyzed parameters $Pr(i)$ and $Ps(i)$ refer to values at each time. Then, the comparator unit 12 compares the analyzed parameters $Pr(i)$ and $Ps(i)$ at each input time. If the analyzed parameters $Pr(i)$ and $Ps(i)$ are equal to each other or if both of them are determined as equivalent to each other, it can be determined that only an echo caused by the speech of a far-end talker is generated. In contrast, if the parameters $Pr(i)$ and $Ps(i)$ are different from each other, it is judged that a state of both the speeches of the far-end talker and near-end talker being simultaneously transmitted, i.e., double talk, is generated. In such a case, the comparator unit 12 sends a signal DT indicative of a generation of the double talk to the echo path estimation circuit/echo replica generator 3. As a consequence, the learning function of estimation of an echo path is turned off.

The comparison of the analyzed parameters will be described in more detail. For example, in the case where only the far-end talker is engaged in speech and an echo is present, Rout corresponds to the speech of the far-end talker whereas Sin corresponds its echo. In this case, the pitches of the speech of the far-end talker and its echo become generally equal to each other at a predetermined time. Since a delay of several tens ms (for example, about 60 ms) occurs between an input and an output, i.e., between the signals Rout and Sin, of the hybrid circuit 2, if the analyzed parameters of the two are compared exactly at the same time, they are, indeed, slightly different. However, if the analyzed parameters of the two are compared within a range of a predetermined time, taking into consideration such a delay, they are almost the same. In this case, namely, in the case where an echo is present, the learning function of estimation of an echo path works.

On the other hand, in the case where both the far-end talker and near-end talker are engaged in speech, namely, in the case where the double talk is present, Rout corresponds to the speech of the far-end talker whereas Sin corresponds to the speech of the near-end talker. In this case, the speech pitches of the two are necessarily different. The reason is that the content of the speech of the far-end talker is different from that of the near-end talker. Even if both the far-end and near-end talkers' speeches are exactly the same, speech pitches thereof are necessarily different because the characteristics of the vocal cords of them are different and therefore, they are necessarily different in speech pitches. In such a case, it can be judged that the double talk is present.

Heretofore, since a judgment is made as to whether or not the double talk is present, by comparing the levels, accuracy of the double talk detection depends on the difference in speech transmitting levels between the far-end talker and the near-end talker. In this embodiment, however, since a way of comparison, which does not depend on levels such as speech pitches and which is based on analyzed parameters, is employed, the double talk can be detected correctly.

(Second Embodiment)

Figure 3:
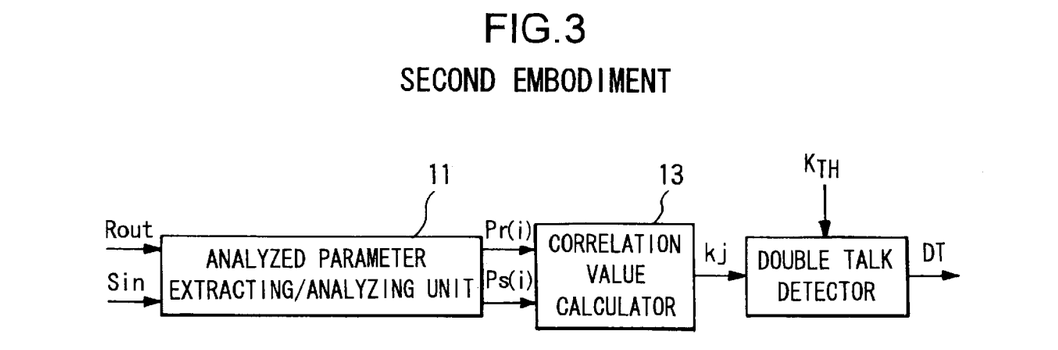
FIG. 3 is a block diagram showing a schematic construction of an apparatus embodying a double talk detecting method according to a second embodiment of the present invention.

FIG. 3 is a block diagram showing a schematic construction of an apparatus embodying a double talk detecting method according to the second embodiment of the present invention. This apparatus is located in the afore-mentioned control unit 4. In this illustration, the analyzed parameter extracting/analyzing unit 11 is constructed in the same manner as the first embodiment.

A correlation value calculator 13 calculates a time correlation value kj of the analyzed parameters Pr(i) and Ps(i) input therein, in accordance with the following expression (13).

$$kj = 1 \bigg/ \sqrt{G_R G_S} \cdot \sum_{i=j-N_S}^{j} Pr(i - N_D) P_S(i) \qquad (13)$$

where $N_D$ represents a sample value of the echo delay and $N_S$ represents a section in which the above-mentioned correlation calculation is made. $G_R$ and $G_S$ are expressed by the under-listed expressions (14) and (15), respectively. The above-mentioned correlation value kj represents the degree of correlation of fluctuations of the analyzed parameters Pr(i) and Ps(i) in a certain section (namely, i(=j−$N_S$)~j).

$$G_R = \sum_{i=j-N_S}^{j} Pr^2(i - N_D) \qquad (14)$$

$$G_S = \sum_{i=j-N_S}^{j} Ps^2(i) \qquad (15)$$

Then, the double talk detection unit 13 compares the correlation value kj thus calculated with a predetermined threshold $K_{TH}$ and detects/judges whether or not the double talk is present, based on the result of comparison. In this case, if the conditions of the under-listed expression (16) are satisfied, i.e., if the correlation value kj becomes equal to or smaller than the threshold $K_{TH}$, it is judged that the double talk has occurred.

$$kj \leq K_{TH} \qquad (16)$$

In the above expression, the threshold is set within a range of $0 \leq K_{TH} < 1$. It should be noted that this threshold is set to an optimum value through various experiments, actual measurements, or the like.

The threshold kj shows the degree of correlation of fluctuations of the analyzed parameters of both the far-end speech output Rout and near-end speech input Sin. For example, in the case where only the far-end talker is engaged in speech and an echo is present, Rout corresponds to the speech of the far-end talker whereas Sin corresponds its echo. In this case, the degree of correlation between both of them is comparatively high. During that time, namely, during the presence of an echo, the afore-mentioned learning function of estimation of an echo path works. However, in the case where both the far-end talker and near-end talker are engaged in speech, i.e., in the case where the double talk is present, Rout corresponds to the speech of the far-end talker whereas Sin corresponds to the speech of the near-end talker. In this case, the speech pitches of the far-end talker and near-end talker are different and therefore, the degree of correlation of the analyzed parameters between them is lowered. Therefore, when this degree of correlation is lowered below a predetermined value (namely, threshold), it can be judged that the double talk has occurred. This embodiment is made based on such principles as mentioned.

(Third Embodiment)

A: Construction of the Embodiment

Figure 4:
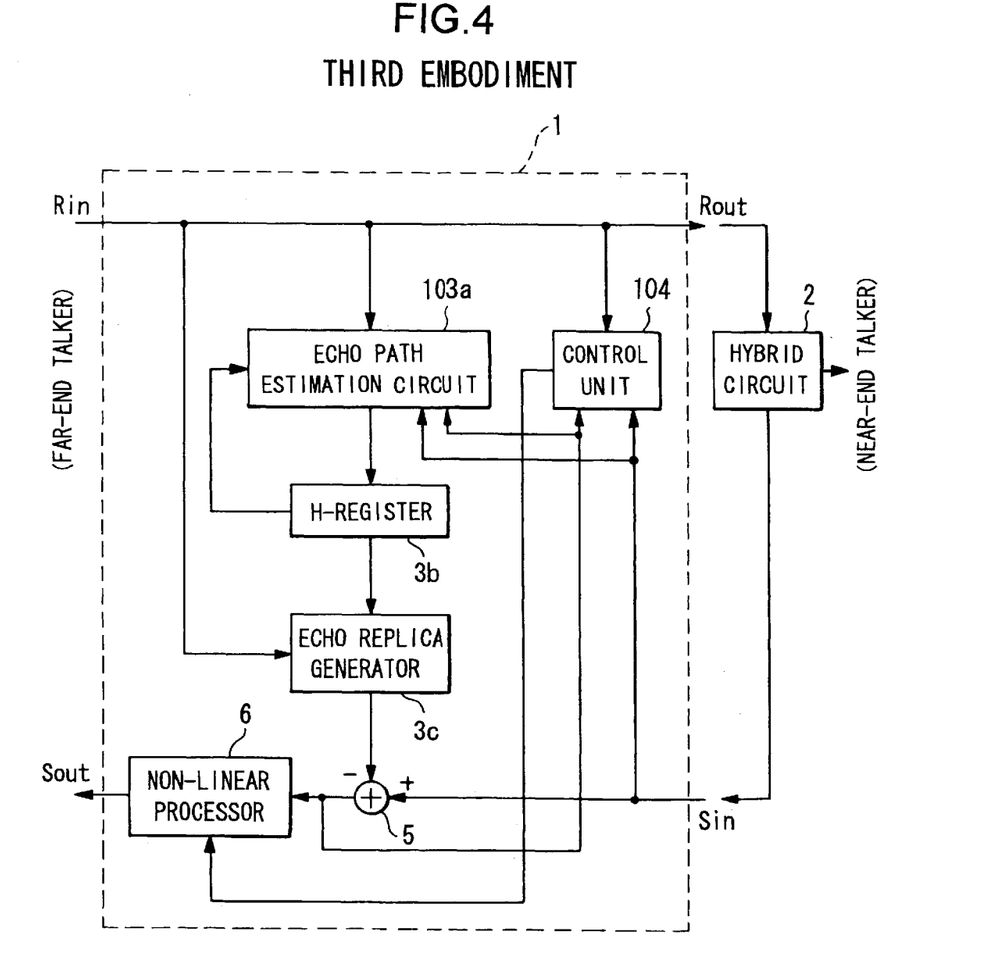
FIG. 4 is a block diagram showing a schematic construction of an apparatus embodying a double talk detecting method according to a third embodiment of the present invention.

FIG. 4 is a block diagram showing a construction of one embodiment of the present invention. A control unit 104 in this embodiment performs merely the controlling of the non-linear processor 6, different from the control unit 4 shown in FIG. 5. Specifically, it detects the far-end talker's single talk and performs merely the controlling of a switching operation of the non-linear processor 6. The double talk detection in this embodiment is performed within an echo path estimation circuit 103a.

Figure 5:
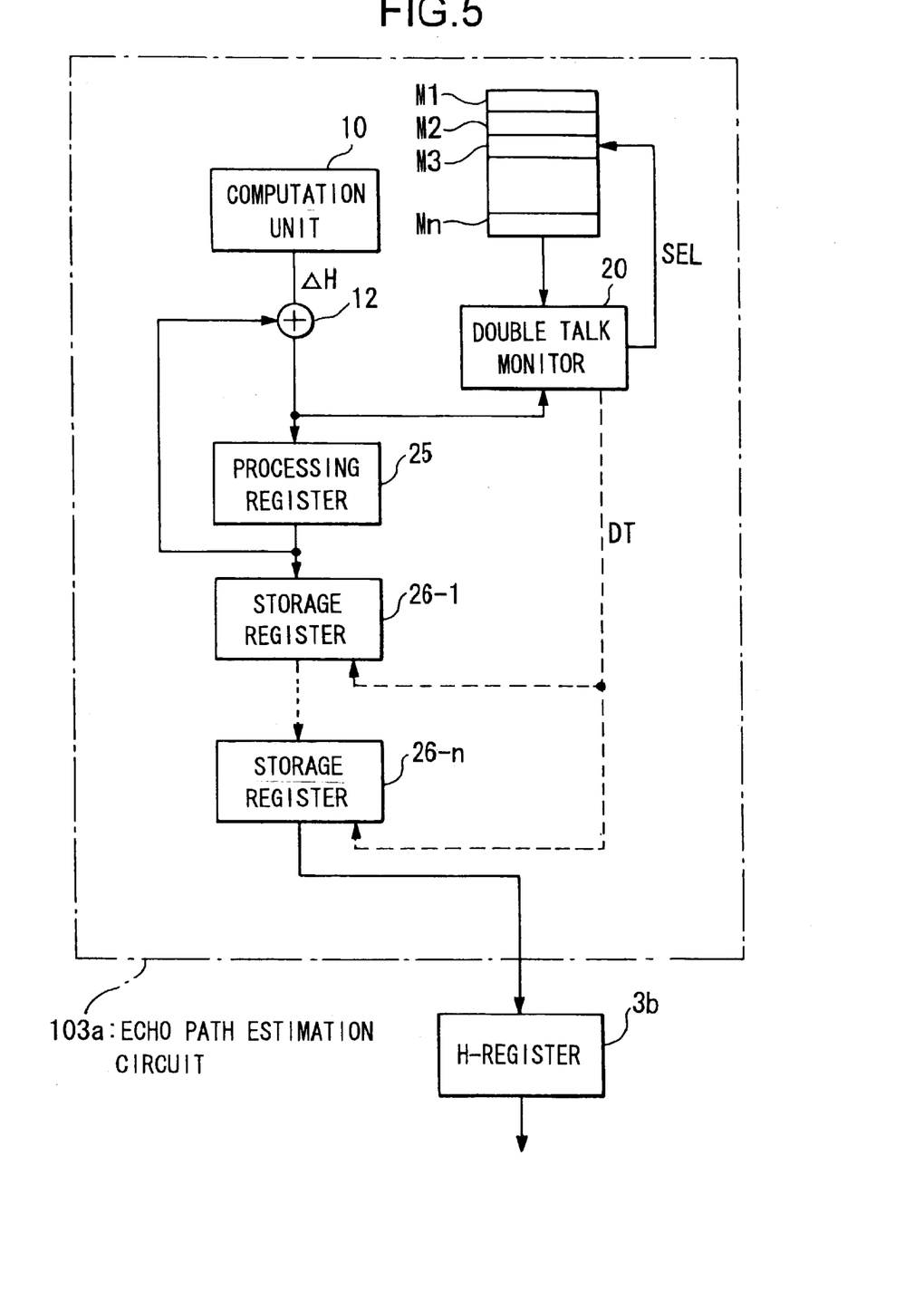
FIG. 5 is a block diagram showing a construction of an important portion of the apparatus shown in FIG. 4.

FIG. 5 is a block diagram showing a construction of an important portion of the echo path estimation circuit 103a. In the illustration, reference numeral 10 denotes a computation unit for calculating a fluctuation ΔH of a tap coefficient H in accordance with the learning identification algorithm, and reference numeral 12 denotes an adder.

Similarly, reference numeral 25 denotes a processing register which is constructed in the same manner as the H-register 3b. Output signals from the processing register 25 are supplied to a storage register 26-1 and the adder 12, respectively. A plurality of such storage registers are provided as represented by 26-1 to 26-n. The construction of each register is the same as the H-register 3b. The tap coefficient H is gradually transmitted from the storage register 26-1 toward the storage register 26-n. An output data from the storage register 26-n is supplied to the H-register 3b.

Figure 6:
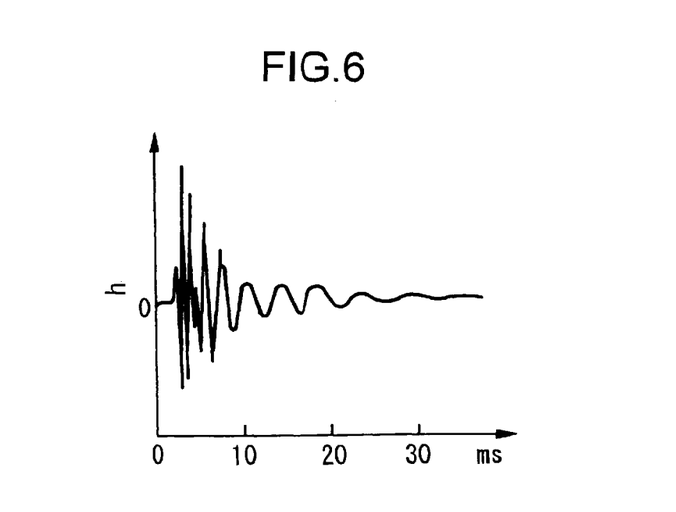
FIG. 6 is a graph showing a general impulse response of an echo path.

In general, response characteristic of an impulse of the echo path is as shown in FIG. 6. This response characteristic of the echo path corresponds directly to the pattern of the tap coefficient H. More strictly, if the echo path estimation circuit 103a performs a correct learning, a time series pattern (see the expression (7)) of the calculated tap coefficient H is the same as the response characteristic of the impulse of the echo path.

However, depending on the types of hybrids and variation in characteristics of individual hybrids, the response characteristic of the echo path is slightly different. In this embodiment, the response characteristic of the echo path is classified into about 10 to 20 patterns which are selected so as not to provide substantial inconveniences in actual practice. The patterns indicative of individual response characteristics are stored in memories M1 to Mn, respectively.

Reference numeral 20 denotes a double talk monitor. In response to a signal SEL, the double talk monitor 20 selects the memories M1 to Mn one after another and compares the response characteristics stored in the various memories with the output tap coefficient H from the adder 12.

Then, the double talk monitor 20 watches how far the tap coefficient H, which is output from the adder 12, is remote from the response characteristics (reference values) stored in the memories. If they are remote from the response characteristics to the extent exceeding a range of allowable errors which are preliminarily established for all of the memories M1 to Mn, the double talk monitor 20 outputs a double talk detection signal DT. In this case, information indicative of allowable errors is also stored in the memories M1 to Mn.

B: Operation of the Embodiment

Operation of the embodiment thus constructed will now be described. Firstly, when the speech is started, the computation unit 10 calculates such a ΔH capable of reducing the residual echo in accordance with the learning identification algorithm and adds the obtained ΔH to the current tap coefficient H (tap coefficient in the processing register 25) to prepare a tap coefficient of the next time point. The prepared tap coefficient is supplied to the processing register 25. By repeating the above procedure, the tap coefficient H in the processing register 25 is adaptively controlled. The tap coefficient H, which has been supplied to the processing register 25, is gradually transmitted to the storage registers 26-1 to 26-n. Therefore, the tap coefficient H stored in the storage register 26-n is a tap coefficient which is intended before several samplings. Since the tap coefficient H stored in the storage register 26-n is transmitted to the H-register 3b, the echo replica generator 3c generates an echo replica based on the tap coefficient which is intended before several samplings.

If no double talk is generated at that time, the tap coefficient H, which is output from the adder 12, is coincident with the response characteristic stored in one of the memories M1 to Mn or is converged into the range of the allowable errors. Therefore, the double talk monitor 20 does not output the double talk detection signal DT.

On the other hand, when the double talk occurs while the speech is going on, the computation unit 10 is brought into a mis-learning state because the speech signal of the near-end talker is superimposed on the adder 5. As a consequence, the calculated value of ΔH does not correspond to the impulse response of the echo path. Consequently, the value of the tap coefficient H, which is output from the adder 12, is deviated from the response characteristics stored in the memories M1 to Mn. When the deviation exceeds the allowable limit of errors with respect to all of the memories M1 to Mn, the double talk monitor 20 outputs the double talk detection signal DT.

At the time point the double talk detection signal DT is output, the tap coefficient H, which is stored in the storage register 26-n intended before several samplings, i.e., the correct coefficient H before the double talk state is created, is transmitted to the H-register 3b. Consequently, the echo replica generator 3c does not generate an unnecessary echo replica and generates an echo replica based on the tap coefficient H which is calculated immediately before the double talk state is created. When the double talk detection signal DT is supplied, the storage registers 26-1 to 26-n do not accept any new input but keep holding the internal data. Therefore, the tap coefficient H supplied to the H-register 3b holds the value immediately before the double talk state is created.

On the other hand, the tap coefficient written in the processing register 25 is successively supplied to the adder 12 in order to add ΔH thereto. In this case, since the double talk state is present, the value of ΔH becomes a wrong value, the tap coefficient H remains as "a deviated value" with respect to the reference value (response characteristic in each memory).

When the double talk state is finished and only the speech signal of the far-end talker is present, ΔH calculated by the computation unit 10 gradually becomes closer to the reference value and is finally converged into the range of the allowable value, because it gradually becomes a correct value. As a consequence, the double talk monitor 20 stops the transmission of the double talk detection signal DT.

When transmission of the double talk detection signal DT is stopped, the storage registers 26-1 to 26-n resume the shift of the tap coefficient H. Note that the storage register 26-n is closed at its input end until the content of the processing register 25 at the time point the transmission of the double talk detection signal DT is stopped, is supplied. As a consequence, the content of the H-register 3b is not renewed until the arrival of a correctly renewed tap coefficient. In this way, a state, which existed before the double talk is detected, is created again and a correctly renewed tap coefficient H is supplied to the H-register 3b.

As apparent from the foregoing description, even in the event that the double talk is detected, the H-register 3b holds a tap coefficient which is intended before several samplings and therefore, it is hardly susceptible to any adverse effect caused by mis-learning. When the double talk state is finished, a tap coefficient reflecting the result of learning is transmitted again to the H-register 3b.

In this way, according to this embodiment, the impulse response characteristics of the echo path are stored in the storage means and a judgment is made as to whether or not the double talk is present, based on the result of comparison between the output tap coefficient from the echo path estimation means and the impulse response characteristics within the storage means. Therefore, a reliable double talk detection can be performed in accordance with the characteristics of the hybrids.

Further, the tap coefficient, which is output from the echo path estimation means, is stored in the tap coefficient delayed storage means after the delay of a plurality of stages. With this feature, an echo replica can be generated by a tap coefficient before the double talk occurs.

(Fourth Embodiment)

Figure 8:
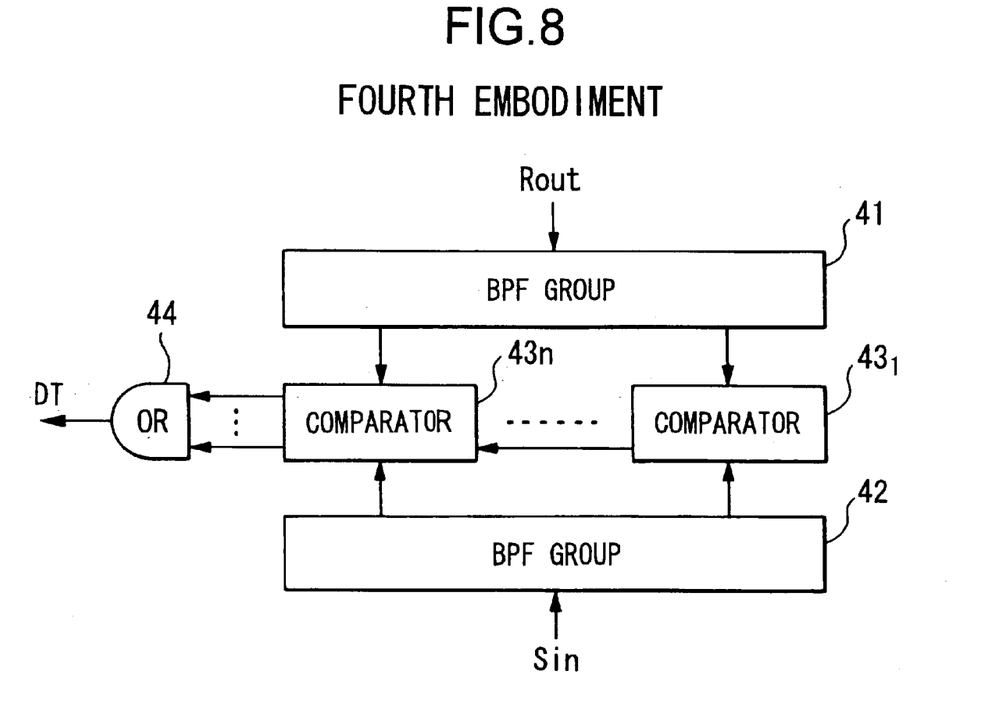
FIG. 8 is a block diagram showing a schematic construction of an apparatus embodying a double talk detecting method according to a fourth embodiment of the present invention.

FIG. 8 is a block diagram showing a schematic construction of the fourth embodiment embodying a double talk detecting method according to the present invention. This apparatus is located within the control unit 4. In this illustration, reference numerals 41 and 42 denote groups of band-pass filters constituted of a plurality of band-pass filters (BPF), respectively. The band-pass filters group 41 divide the signal of the far-end speech output Rout into a plurality of frequency bands (hereinafter referred to as the "sub-bands") and output the same. The band-width of each sub-band is selected to be an optimum width through various experiments/actual measurements. Similarly, the band-pass filters group 42 divide the signal of the near-end speech input Sin into a plurality of sub-bands and output the same. The sub-bands in the band-pass filters group 41 correspond to the sub-bands in the band-pass filters group 42, respectively.

Reference numerals $43_1$ to $43_n$ denote comparators, respectively. The number n (n represents an integer of 2 or more) of the comparators corresponds to the number of the sub-bands. That is, each comparator 43 compares the far-end speech output Rout with the near-end speech input Sin in each sub-band. In the case where the far-end speech output Rout and the near-end speech input Sin are different in power here, each comparator 43 outputs a signal indicating to that effect.

Output signals from the comparators $43_1$ to $43_n$ are input into an OR circuit 44. When a signal is output from at least one of the comparators $43_1$ to $43_n$, the OR circuit 44 generates a double talk detection signal DT indicative of a generation of the double talk and outputs the same to the echo path estimation circuit/echo replica generator 3. By doing this, the learning function of the echo path is turned off.

Figure 9:
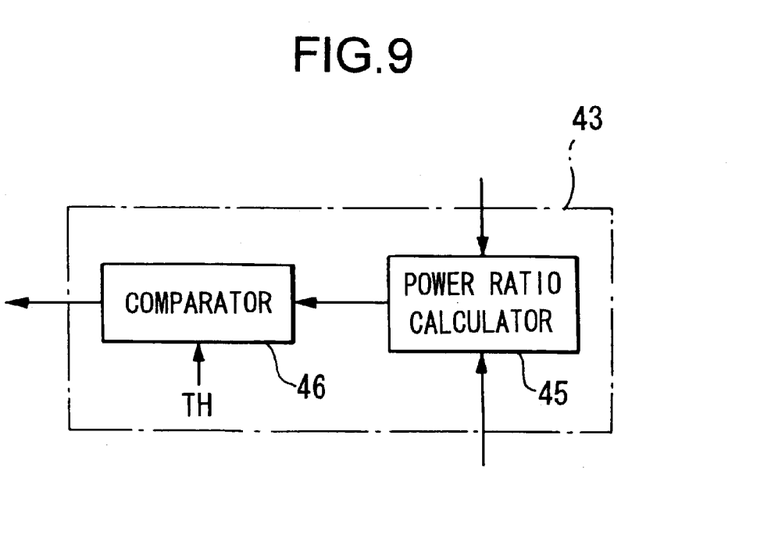
FIG. 9 is a block diagram showing one example of a detailed construction of a comparator used in the fourth embodiment.

FIG. 9 shows one example of a construction of an internal circuit of each comparator 43. Here, reference numeral 45 denotes a power ratio calculator. From the far-end speech output Rout and the near-end speech input Sin in each sub-band, the power ratio calculator 45 calculates a power ratio of the two. The power ratio calculated here is compared with a predetermined threshold TH in the comparator unit 46, and a signal is output when the power ratio exceeds the threshold.

Principles of operation of the present invention will now be described. In the present invention, the signal of Rout and the signal of Sin are divided into sub-bands, respectively. Then, the signal on the Rout side and the signal on the Sin side are compared with each other in each sub-band, and it is judged that the double talk has occurred when both of the signals are different or when the power ratio of both of the signals exceeds a predetermined threshold. Heretofore, since a judgment is made as to whether or not the double talk is present, merely based on the power ratio and without dividing each signal into sub-bands, the accuracy of double talk detection is subjected to the effect of the speech levels of the far-end talker and near-end talker. However, the present invention can solve such a problem by dividing each signal into a plurality of sub-bands and comparing them.

Usually, the speech of the far-end talker has a different frequency characteristic from that of the near-end talker. The reason is that the contents of speeches of the far-end talker and near-end talker are different. Even if the contents of speeches of the far-end talker and near-end talker are the same, their frequency characteristics are necessarily different because vibration waveforms of their vocal codes are different for each person. However, the double talk is heretofore detected merely based on the power ratio of the signals and disregarding the difference in frequency characteristic. The present invention pays attention to this difference in frequency characteristic and divides the waveform of the speech of each person into sub-bands. As described above, since the frequency characteristic of the speech of each person is different, even if the speech transmitting power of the far-end talker is larger than that of the near-end talker and both of them are uttering the same sound, for example, their power ratio becomes noticeable in at least one of the sub-bands. Therefore, if this is detected, a generation of double talk can be correctly detected.

(Modified Embodiment)

The present invention is not limited to the above-mentioned embodiments. For example, various modifications can be made as hereinafter described.

(1) In the above-mentioned first and second embodiments, speech pitches are used as the analyzed parameters. However, the subject matter of the present invention is not limited to that and other parameters can be applied. For example, formant, band width, etc. can be employed as the analyzed parameters. With respect to a method for analyzing such a talker's speech, a variety of methods are already proposed and known and therefore, detailed description thereof is omitted in this specification. An important thing is that the analyzed parameters can extract the features of the talker's voice.

(2) In the above-mentioned first to fourth embodiments, the present invention is applied to a signal transmission between a mobile telephone and an terrestrial telephone. However, the application of the present invention is not limited to this. The present invention can likewise be applied to all communication networks of the type in which signals are transmitted between a two-wire circuit and a four-wire circuit.

(3) In the above-mentioned second embodiment, the double talk is detected by comparing the correlation and the threshold. In the alternative, the double talk may be detected based on changes in state of correlation or the like, instead of comparing the correlation with the threshold.

(4) In the third embodiment, the allowable errors are stored in the memories M1 to Mn. In the alternative, the allowable errors may be stored in the double talk monitor 20.

(5) Further, in the third embodiment, the double talk is detected by means of comparison with the impulse response characteristics in the memory. However, other detecting methods may be used. For example, it can be judged that the double talk has occurred when the value of $\Delta H$ is greatly deviated from a usually expectable range or when some signals are generated during the delayed time.

Figure 7:
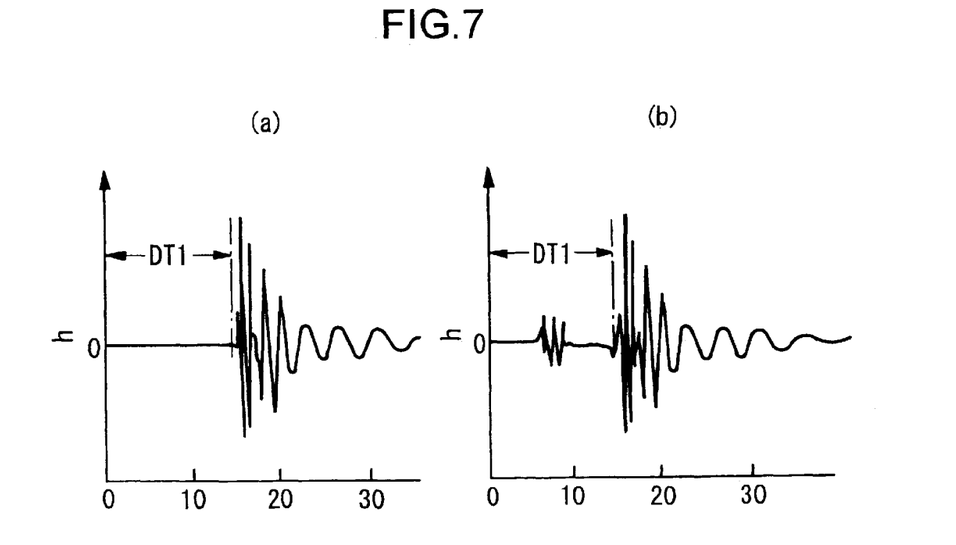
FIG. 7 is a graph showing an impulse response of an echo path when a delay is involved.

The latter method will be described with reference to FIG. 7. Presume that the impulse response, which was detected after the start of speech, has a delayed time DT1 as shown in FIG. 7(a). If the echo path estimation circuit 103a is operated normally, no signals are supposed to be generated during this time zone. However, if a tap coefficient H having errors is calculated because of a wrong detection of the double talk, an unnecessary echo is generated in the echo replica generator 3c. As a consequence, a signal is detected within the delayed time DT, as shown in FIG. 7(b). Therefore, an arrangement can be made such that the delayed time is preliminarily measured and stored, so that it can be judged that the double talk has occurred when some signals are detected during the time. Other methods may be employed in accordance with necessity. What is important here is an arrangement in which it is judged that the double talk has occurred when a usually unexpected thing is appeared.

(6) As apparent from the description of the third embodiment, according to the present invention, a greatly deviated value is not transmitted to the H-register 3b. For this reason, a request for stability with respect to mis-learning of the computation unit 10 is decreased and the learning speed of an echo path can be set faster to that extent. That is, by increasing an adaptation constant of the tap coefficient H by setting a of the expression (4) or g of the expression (11) large, the follow-up speed of the tap coefficient H can be increased. If the learning speed is set sufficiently high and the accuracy of reference values by the memories M1 to Mn is increased, the double talk can be detected even faster. Further, a reduced number, if necessary, of the storage registers 26-1 to 26-n will not cause a greatly deviated value to be transmitted to the H-register 3b.

Furthermore, if the learning speed is sufficiently high and no inconvenience is particularly involved in view of circumstance of the use in the state where the accuracy of reference values is high, an arrangement can be made in which the storage registers 26-1 to 26-n are not employed and the tap coefficient H immediately after the detection of the double talk is held in the H-register 3b, so that the same can be continuously used during the time the double talk is under detection.

(7) In the third embodiment, a plurality of memories for storing impulse response characteristics are employed. However, in the case where the hybrids to be used are somewhat specified and their characteristics are substantially the same, employment of only one memory is good enough.

(8) In the fourth embodiment, groups of band-pass filters are employed as means for dividing a speech signal into a plurality of sub-bands and outputting the same. However, the present invention is not limited to this. Other means, such as other kinds of filters and calculators, may be employed.

(9) The present invention is not limited to the technique for dividing a speech signal into a plurality of sub-bands. Various kinds of techniques for comparing speech signals in a frequency region may be employed. For example, if a comparison between the frequencies of basic components of speech signals on the side of a far-end talker and on the side of a near-end talker reveals that a difference between the two frequencies is equal to or smaller than a predetermined value, it may be judged that the double talk has occurred. Furthermore, as the frequency analyzer, an FFT (fast Fourier transform), or the like may likewise be employed.

What is claimed is:

1. A double talk detecting method applicable to an echo canceler which is employed in a telephone line network for performing a transmission between a speech coming through a four-wire circuit and another speech coming through a two-wire circuit, comprising:
 a first step of extracting a first speech pitch from a first speech signal corresponding to a speech on said four-wire circuit side, said first speech pitch being specified by a waveform of said first speech signal;
 a second step of extracting a second speech pitch from a second speech signal corresponding to a speech on said two-wire circuit side, said second speech pitch being specified by a waveform of said second speech signal;
 a third step of comparing said first speech pitch with said second speech pitch and judging whether or not a double talk is present, based on a result of the comparison;
 wherein said third step further comprises the steps of calculating correlation values of fluctuations of the speech pitches of said first and second speech signals; and
 judging whether or not a double talk is present, based on said correlation values of fluctuations of the speech pitches of said first and second speech signals.

2. A double talk detecting apparatus applicable to an echo canceler which is employed in a telephone line network for performing a transmission between a speech transmitted coming through a four-wire circuit and another speech coming through a two-wire circuit, comprising:
 first feature extraction means for extracting a first feature from a first speech signal corresponding to a speech on said four-wire circuit side, said first feature being specified by a waveform of said first speech signal;
 second feature extraction means for extracting a second feature from a second speech signal corresponding to a speech on said two-wire circuit side, said second feature being specified by a waveform of said second speech signal;
 double talk judgment means for comparing said first feature with said second feature and judging whether or not a double talk is present, based on a result of the comparison;
 wherein said first feature is a result of sampling of said first speech signal, said second feature is a result of sampling of said second speech signal, and said double talk detection means comprises:
 echo path estimation means for estimating an echo path by a learning identification algorithm; and
 storage means for preliminarily storing a state corresponding the result of estimation when the double talk does not present, content stored in said storage means being compared with the result of estimation made by said echo path estimation means and a fact as to whether or not a double talk is present is detected based on the comparison.

3. A double talk detecting apparatus according to claim 2, wherein said storage means stores a delay time as a state corresponding to the result of estimation when the double talk does not present; and
 said double talk judgment means compares said delay time with the result of estimation and judges that a double talk is present when a whatever signal is detected during the delay time.

4. An echo canceler to be employed in a telephone line network for performing a transmission between a speech coming through a four-wire circuit and another speech coming through a two-wire circuit, comprising:
 echo path estimation means for estimating an echo path through a learning identification algorithm and outputting a tap coefficient corresponding to the result of estimation;
 an echo replica generator for generating an echo replica through a convolutional operation performed based on said tap coefficient;
 storage means for storing an impulse response characteristic of an echo path;
 judgment means for comparing the tap coefficient output by said echo path estimation means with an impulse response characteristic in said storage means and judging that a double talk is present when the result of comparison exceeds a predetermined allowable value; and
 control means for stopping the output of the tap coefficient from said echo path estimation means when said judgment means judged that a double talk is present.

5. An echo canceler according to claim 4, wherein said echo path estimation means comprises tap coefficient delayed storage means;
 a tap coefficient stored in said tap coefficient delayed storage means, instead of said echo path estimation means, being supplied to said echo replica generation means when said judgment means judged that a double talk is present.

6. A double talk detecting method according to claim 1, wherein said first speech pitch is a frequency component of said first speech signal, and said second speech pitch is a frequency component of said second speech signal.

7. A double talk detecting method applicable to an echo canceler which is employed in a telephone line network for performing a transmission between a speech coming through a four-wire circuit and another speech coming through a two-wire circuit, comprising:
 a first step of extracting a first speech pitch from a first speech signal corresponding to a speech on said four-wire circuit side, said first speech pitch being specified by a waveform of said first speech signal;
 a second step of extracting a second speech pitch from a second speech signal corresponding to a speech on said two-wire circuit side, said second speech pitch being specified by a waveform of said second speech signal;
 a third step of comparing said first speech pitch with said second speech pitch and judging whether or not a double talk is present, based on a result of the comparison;

wherein said third step further comprises the steps of
calculating correlation values of fluctuations of the speech pitches of said first and second speech signals;
comparing said correlation values with a predetermined threshold; and
judging whether or not a double talk is present, based on a result of the comparison.

8. A double talk detecting apparatus applicable to an echo canceler which is employed in a telephone line network for performing a transmission between a speech transmitted coming through a four-wire circuit and another speech coming through a two-wire circuit, comprising:
first feature extraction means for extracting a first feature from a first speech signal corresponding to a speech on said four-wire circuit side, said first feature being specified by a waveform of said first speech signal;
second feature extraction means for extracting a second feature from a second speech signal corresponding to a speech on said two-wire circuit side, said second feature being specified by a waveform of said second speech signal;
double talk judgment means for comparing said first feature with said second feature and judging whether or not a double talk is present, based on a result of the comparison;
wherein said first feature is a result of sampling of said first speech signal, said second feature is a result of sampling of said second speech signal, and said double talk detection means comprises:
frequency band division means for dividing said first and second speech signals into a plurality of frequency bands, respectively and outputting the same;
comparator means for comparing said first and second speech signals in each of said frequency bands and obtaining power rations therebetween; and
double talk detection means for judging whether or not a double talk is present based on the power ration in each of said frequency bands.

9. A double talk detecting apparatus according to claim 8, wherein said frequency band division means is constituted of a plurality of band-pass filters.

10. A double talk detecting apparatus according to claim 8, wherein said double talk detection means judges that a double talk has occurred when the power ratio in at least one frequency band exceeds a predetermined threshold.

* * * * *

UNITED STATES PATENT AND TRADEMARK OFFICE
CERTIFICATE OF CORRECTION

PATENT NO. : 6,272,106 B1
DATED : August 7, 2001
INVENTOR(S) : Toshiro Kawahara et al.

It is certified that error appears in the above-identified patent and that said Letters Patent is hereby corrected as shown below:

<u>Title page,</u>
Item [73], please correct the Assignee's name by deleting "NIT" and inserting instead -- NTT --.

Signed and Sealed this

Fourteenth Day of May, 2002

*Attest:*

JAMES E. ROGAN
*Attesting Officer*     *Director of the United States Patent and Trademark Office*